(12) United States Patent
Rafferty (10) Patent No.: US 11,365,870 B1
(45) Date of Patent: Jun. 21, 2022

(54) HOLIDAY LIGHT ATTACHMENT SYSTEM (71) Applicant: Dennis Rafferty, Mount Holly, NC (US)

(72) Inventor: Dennis Rafferty, Mount Holly, NC (US)

( * ) Notice: Subject to any disclaimer, the term of this patent is extended or adjusted under 35 U.S.C. 154(b) by 0 days.

(21) Appl. No.: 17/329,319

(22) Filed: May 25, 2021

(51) Int. Cl.
F21V 21/116 (2006.01)
F16L 3/137 (2006.01)
F21V 21/08 (2006.01)
F21V 17/12 (2006.01)
F21V 21/096 (2006.01)
F21S 4/10 (2016.01)

(52) U.S. Cl.
CPC ............ *F21V 21/116* (2013.01); *F16L 3/137* (2013.01); *F21S 4/10* (2016.01); *F21V 17/12* (2013.01); *F21V 21/0808* (2013.01); *F21V 21/096* (2013.01)

(58) Field of Classification Search
CPC ... F21S 4/10; F21S 4/15; F21V 21/116; F21V 21/096; F21V 21/0965; F21V 33/0084; F16L 3/137; H01K 3/32; B25J 15/0608; B25J 1/02; B25J 1/04; B25J 1/00
USPC ................................ 294/65.5, 190, 192, 158
See application file for complete search history.

(56) References Cited

U.S. PATENT DOCUMENTS 5,163,597 A * 11/1992 Napoli, Jr. ............... B25C 3/006
227/140
5,560,975 A * 10/1996 Casper .................... A47G 33/10
24/370
5,695,273 A 12/1997 Lanning
6,227,584 B1 * 5/2001 Reuther ..................... B25J 1/04
294/104
6,352,291 B1 * 3/2002 Tortajada ................ F21V 19/04
294/211
6,461,018 B1 * 10/2002 Chanslor ................. F21S 6/001
248/530
6,467,823 B1 * 10/2002 Brekken .................. F21V 19/04
29/241
6,473,953 B1 * 11/2002 Portnoff .................... B25B 5/06
269/3
6,520,661 B1 * 2/2003 Hill ........................ F21V 21/096
362/249.01
6,652,121 B1 * 11/2003 Kneeshaw ............... F21S 8/038
362/147
7,080,925 B1 * 7/2006 Rushing .................. F21V 21/00
362/249.01

(Continued)

FOREIGN PATENT DOCUMENTS

GB          2314917          1/1998

*Primary Examiner* — Jong-Suk (James) Lee
*Assistant Examiner* — James M Endo (57) ABSTRACT The holiday light attachment system is an extension structure. The holiday light attachment system includes an elevated anchor, a cable holder, a shaft mount, an extension shaft, and a light string. The cable holder attaches the light string to the elevated anchor. The shaft mount attaches to the extension shaft. The shaft mount is a tool that secures the cable holder to the elevated anchor. The holiday light attachment system attaches the light string to an elevated structure. By elevated structure is meant a surface that is above the reach of an individual. The holiday light attachment system allows the individual to attach the light string to the elevated structure without having to change the elevation of the individual.

11 Claims, 4 Drawing Sheets

(56) References Cited

U.S. PATENT DOCUMENTS

| | | | |
|---|---|---|---|
| 7,429,067 B1* | 9/2008 | Rosa | F21V 19/04 248/303 |
| 7,669,827 B2 | 3/2010 | Urrtia | |
| 9,056,393 B1* | 6/2015 | Gary | F21V 19/04 |
| D772,027 S | 11/2016 | Man | |
| 9,853,426 B2* | 12/2017 | Hendricks | B25G 1/04 |
| 9,964,291 B1* | 5/2018 | Del Rio | F21S 4/10 |
| 10,344,956 B2* | 7/2019 | Hess | F21V 21/096 |
| 2004/0238696 A1* | 12/2004 | Herrera | F21V 21/08 248/63 |
| 2006/0120089 A1 | 6/2006 | Liberatore | |
| 2007/0057124 A1* | 3/2007 | Kwilosz | F16L 3/137 248/74.1 |
| 2008/0061571 A1* | 3/2008 | Schopp | B25B 13/5091 294/24 |
| 2009/0095848 A1* | 4/2009 | Holbrook | F21S 4/10 248/74.2 |
| 2009/0194662 A1* | 8/2009 | Urrutia | H01K 3/32 248/544 |
| 2010/0007449 A1* | 1/2010 | Tait | H01F 7/021 335/286 |
| 2010/0225130 A1* | 9/2010 | Thrasher, Jr. | B25B 31/00 294/19.3 |
| 2012/0069587 A1* | 3/2012 | Holland | F21V 21/088 362/396 |
| 2012/0198680 A1* | 8/2012 | Durben | F16L 3/1218 29/428 |
| 2012/0280098 A1* | 11/2012 | Rinck | F21S 4/10 248/304 |
| 2013/0042958 A1* | 2/2013 | Spindler | F21V 21/0808 156/66 |
| 2013/0333197 A1* | 12/2013 | Schulte | F21V 21/088 29/525.08 |
| 2014/0268667 A1* | 9/2014 | Yang | F21V 21/096 362/101 |
| 2015/0308616 A1* | 10/2015 | Abbott | F21V 21/096 248/206.5 |
| 2018/0058670 A1* | 3/2018 | Mitchell | D06F 55/02 |
| 2019/0264866 A1 | 8/2019 | Raab | |
| 2020/0284409 A1* | 9/2020 | Lingelbach | B25G 1/04 |

* cited by examiner

HOLIDAY LIGHT ATTACHMENT SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of mechanical engineering including structural supports for lighting, more specifically, a magnetic device for suspending a light string. (F21V21/096)

SUMMARY OF INVENTION

The holiday light attachment system is an extension structure. The holiday light attachment system comprises an elevated anchor, a cable holder, a shaft mount, an extension shaft, and a light string. The cable holder attaches the light string to the elevated anchor. The shaft mount attaches to the extension shaft. The shaft mount is a tool that secures the cable holder to the elevated anchor. The holiday light attachment system attaches the light string to an elevated structure. By elevated structure is meant a surface that is above the reach of an individual. The holiday light attachment system allows the individual to attach the light string to the elevated structure without having to change the elevation of the individual.

These together with additional objects, features and advantages of the holiday light attachment system will be readily apparent to those of ordinary skill in the art upon reading the following detailed description of the presently preferred, but nonetheless illustrative, embodiments when taken in conjunction with the accompanying drawings.

In this respect, before explaining the current embodiments of the holiday light attachment system in detail, it is to be understood that the holiday light attachment system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the holiday light attachment system.

It is therefore important that the claims be regarded as including such equivalent construction insofar as they do not depart from the spirit and scope of the holiday light attachment system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
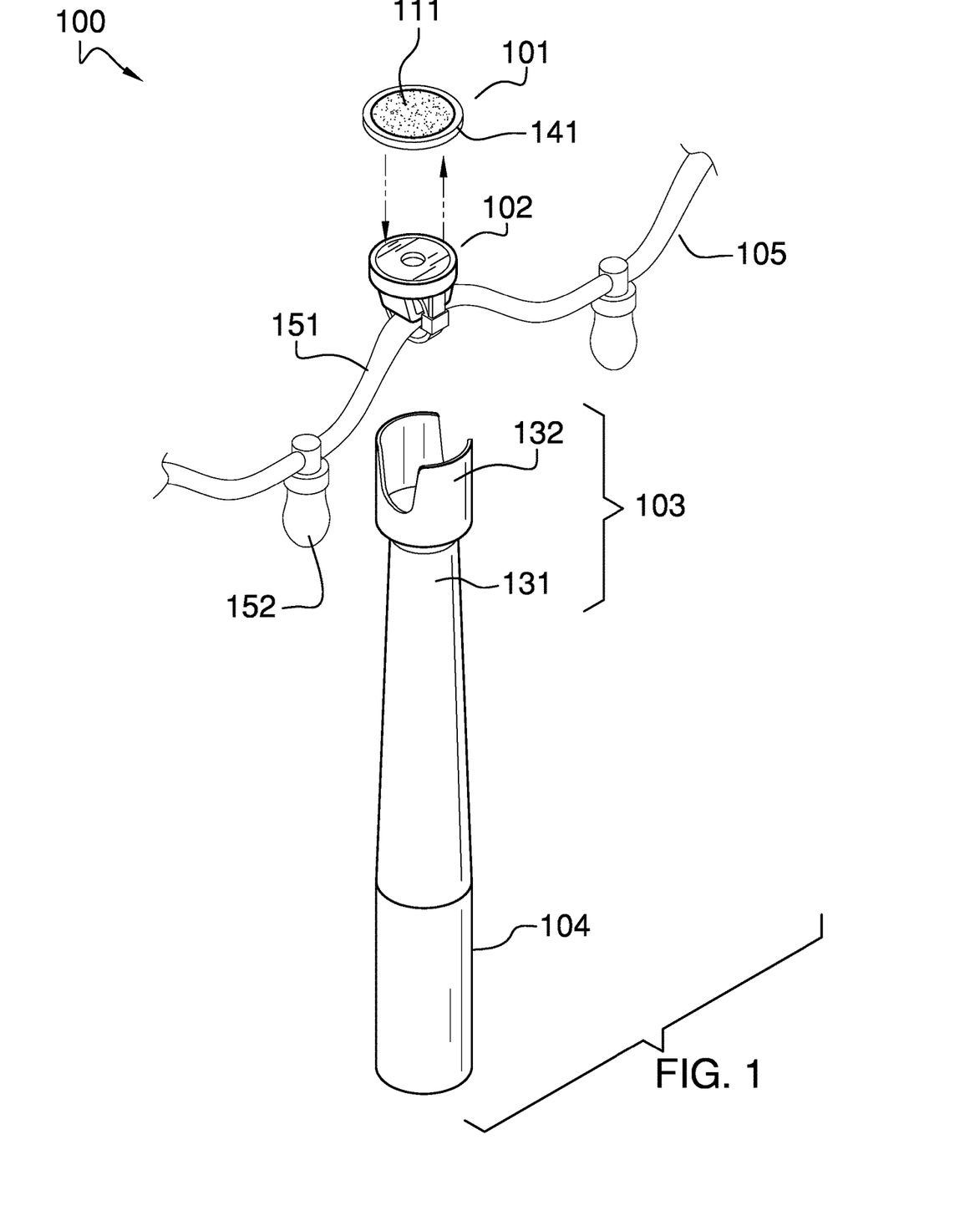
FIG. 1 is a perspective view of an embodiment of the disclosure.
Figure 2:
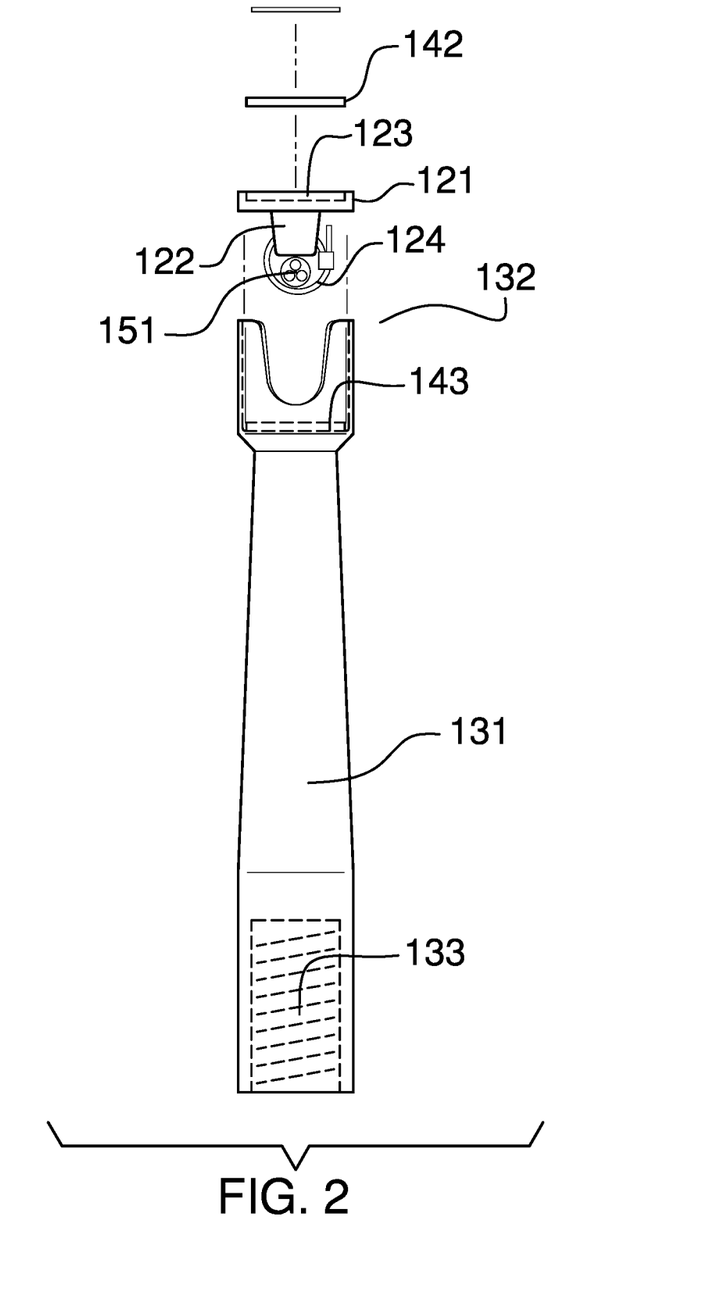
FIG. 2 is an exploded view of an embodiment of the disclosure.
Figure 3:
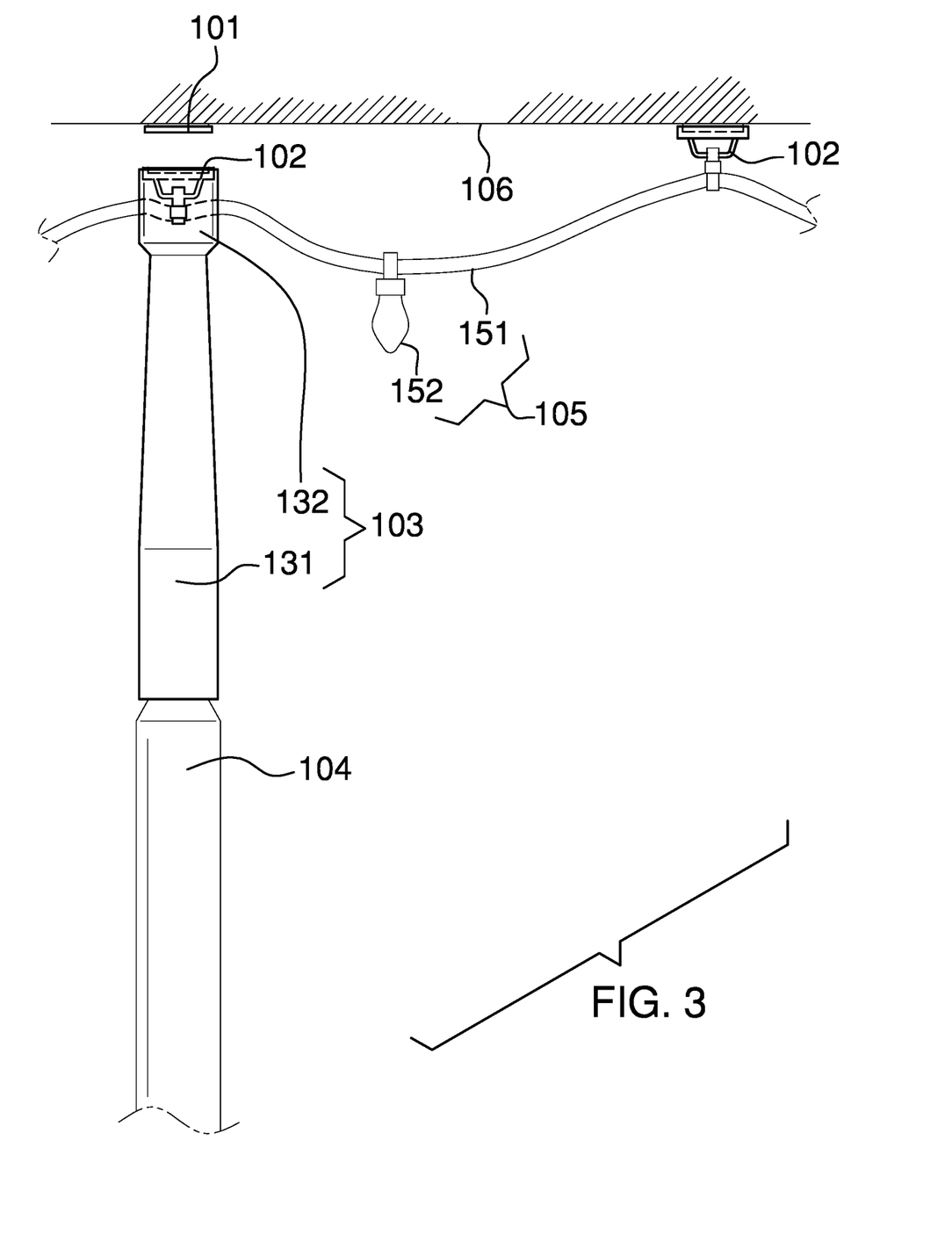
FIG. 3 is an in-use view of an embodiment of the disclosure.
Figure 4:
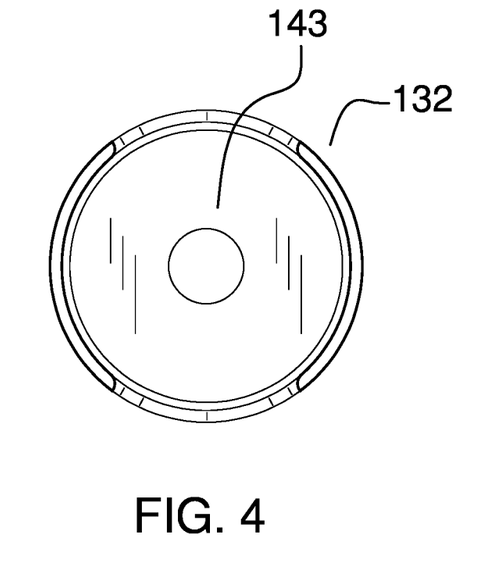
FIG. 4 is a top view of an embodiment of the disclosure.

Detailed reference will now be made to one or more potential embodiments of the disclosure, which are illustrated in FIGS. 1 through 4.

The holiday light attachment system 100 (hereinafter invention) is an extension structure. The invention 100 comprises an elevated anchor 101, a cable 151 holder 102, a shaft mount 103, an extension shaft 104, and a light string 105. The cable 151 holder 102 attaches the light string 105 to the elevated anchor 101. The shaft mount 103 attaches to the extension shaft 104. The shaft mount 103 is a tool that elevates the cable 151 holder 102 to the elevated anchor 101. The invention 100 attaches the light string 105 to an elevated structure 106. By elevated structure 106 is meant a surface that is above the reach of an individual. The invention 100 allows the individual to attach the light string 105 to the elevated structure 106 without having to change the elevation of the individual.

The elevated structure 106 is a surface that is designated to have mounted on it the elevated structure 106. The elevated structure 106 receives the loads of the elevated anchor 101 and the light string 105 such that the light string 105 is suspended from the elevated structure 106.

The light string 105 is an electric device used to generate illumination. The light string 105 is defined elsewhere in this disclosure. The light string 105 comprises a cable 151 and a plurality of illumination elements 152. The plurality of illumination elements 152 electrically connect to the cable 151 such that the cable 151 suspends the plurality of illumination elements 152 from the elevated anchor 101. The plurality of illumination elements 152 electrically connect to the cable 151 such that the cable 151 provides electric energy used to illuminate the plurality of illumination elements 152. The cable 151 and the plurality of illumination elements 152 are defined elsewhere in this disclosure.

The extension shaft 104 is a prism-shaped structure. The shaft mount 103 attaches to the extension shaft 104 using a threaded connection 133. The shaft mount 103 attaches to the extension shaft 104 to form a composite prism structure. The extension shaft 104 is an extension structure. The extension shaft 104 bridges the reach between an individual using the invention 100 and the elevated structure 106.

The elevated anchor 101 is a mechanical structure. The elevated anchor 101 permanently attaches to the elevated structure 106. The elevated anchor 101 suspends the cable 151 holder 102 from the elevated structure 106. The elevated anchor 101 mounts in the shaft mount 103 such that the shaft mount 103 and the extension shaft 104 elevate and attach the elevated anchor 101 to the elevated structure 106. The elevated anchor comprises an adhesive 111 and a first magnet 141.

The first magnet 141 is a prism-shaped structure. The first magnet 141 is a disk-shaped structure. The first magnet 141 is a permanent magnet. The first magnet 141 permanently attaches to the elevated structure 106. The first magnet 141 magnetically attaches the cable 151 holder 102 to the elevated structure 106.

The adhesive 111 is a chemical compound. The adhesive 111 is applied as a coating to a congruent end of the disk shape of the first magnet 141. The adhesive 111 permanently attaches the first magnet 141 to the elevated structure 106. The adhesive 111 is defined elsewhere in this disclosure.

The cable 151 holder 102 is a mechanical structure. The cable 151 holder 102 attaches to the elevated anchor 101. The cable 151 holder 102 attaches to the light string 105. The cable 151 holder 102 attaches the light string 105 to the elevated anchor 101. The shaft mount 103 and the extension shaft 104 elevate the cable 151 holder 102 to the elevated anchor 101 to attach the cable 151 holder 102 to the elevated anchor 101. The cable 151 holder 102 comprises a disk structure 121, a loop structure 122, and a cable 151 tie 124.

The disk structure 121 is a prism-shaped structure. The disk structure 121 has a disk shape. The loop structure 122 attaches to a congruent end of the disk shape of the disk structure 121. The loop structure 122 forms a loop. The loop structure 122 forms an anchor point used by the cable 151 tie 124 to bind the cable 151 of the light string 105 to the cable 151 holder 102. The cable 151 tie 124 is defined elsewhere in this disclosure. The cable 151 tie 124 inserts through the loop structure 122 such that the cable 151 tie 124 can wrap around the cable 151 to bind the cable 151 to the loop structure 122. The disk structure 121 further comprises a disk recess 123 and a second magnet 142.

The disk recess 123 is a negative space. The disk recess is formed in the congruent end of the disk shape of the disk structure 121 that is distal from the loop structure 122. The disk recess 123 is geometrically similar to the second magnet 142 such that the second magnet 142 inserts into the disk recess 123. The second magnet 142 permanently installs in the disk recess 123.

The second magnet 142 is a prism-shaped structure. The second magnet 142 is a disk-shaped structure. The second magnet 142 is a permanent magnet. The second magnet 142 permanently attaches to the cable 151 holder 102. The second magnet 142 magnetically attaches the first magnet 141 such that the second magnet 142 secures the cable 151 holder 102 to the elevated anchor 101.

The shaft mount 103 is a mechanical structure. The shaft mount 103 attaches to the extension shaft 104. The elevated anchor 101 attaches to the shaft mount 103 such that the shaft mount 103 and the extension shaft 104 form an extension structure that elevates the elevated anchor 101 to the elevated structure 106. The cable 151 holder 102 attaches to the shaft mount 103 such that the shaft mount 103 and the extension shaft 104 form an extension structure that elevates the cable 151 holder 102 to the elevated anchor 101. The shaft structure 131 further comprises a c-channel 132, a threaded connection 133, and a third magnet 143.

The shaft structure 131 is a prism-shaped structure. The shaft structure 131 attaches to the extension shaft 104 to form a composite prism structure. The shaft structure 131 forms an extension structure that extends the reach between the extension shaft 104 and the c-channel 132.

The threaded connection 133 is a fastening structure that allows the extension shaft 104 to screw into the shaft structure 131. The threaded connection 133 is defined elsewhere in this disclosure.

The c-channel 132 is a mechanical structure. The c-channel 132 is formed in the shape of a c-channel 132. The c-channel 132 is defined elsewhere in this disclosure. The c-channel 132 forms a track structure that allows the cable 151 of the light string 105 to insert into the physical structure of the c-channel 132 as the c-channel 132 is attaching the cable 151 holder 102 from the elevated anchor 101.

The elevated anchor 101 removably inserts into the c-channel 132 such that the shaft mount 103 can elevate the elevated anchor 101 to the elevated structure 106. The elevated anchor 101 removably inserts into the c-channel 132 such that the c-channel 132 releases the elevated anchor 101 after attaching the elevated anchor 101 to the elevated structure 106.

The cable 151 holder 102 removably inserts into the c-channel 132 such that the shaft mount 103 can elevate the cable 151 holder 102 to the elevated anchor 101. The cable 151 holder 102 removably inserts into the c-channel 132 such that the c-channel 132 releases the cable 151 holder 102 after attaching the cable 151 holder 102 to the elevated anchor 101.

The third magnet 143 removably inserts into the c-channel 132 such that the shaft mount 103 can elevate the third magnet 143 to the cable 151 holder 102. The third magnet 143 captures the cable 151 holder 102 by magnetically attaching to the cable 151 holder 102 such that the third magnet 143 will remove the cable 151 holder 102 from the elevated anchor 101.

The third magnet 143 is a prism-shaped structure. The third magnet 143 is a disk-shaped structure. The third magnet 143 is a permanent neodymium magnet. The third magnet 143 removably or is permanently inserted into the c-channel 132. The third magnet 143 magnetically attaches the second magnet 142 such that the third magnet 143 secures the c-channel 132 to the cable 151 holder 102. The magnetic attraction of the third magnet 143 to the second magnet 142 is greater than the magnetic attraction of the second magnet 142 to the first magnet 141 such that the third magnet 143 removes the cable 151 holder 102 from the elevated anchor 101 as the shaft structure 131 is pulled away from the elevated anchor 101.

In a second potential embodiment of the disclosure, the neodymium magnet that forms the third magnet 143 is replaced with an electromagnet.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Bind: As used in this disclosure, to bind is a verb that means to tie or secure a first object to a second object by wrapping a third object around the first object and the second object.

C-Channel: As used in this disclosure, the C-channel is a structure that is formed in a U-shape. The C-channel forms a prism-shaped negative space with an open lateral face that forms a shape characteristic of the letter C when viewed from the congruent ends. The open space of the C-channel is often used as a track. A C-channel is a U-shaped structure.

Cable: As used in this disclosure, a cable is a collection of one or more insulated wires covered by a protective casing that is used for transmitting electricity or telecommunication signals.

Cable Tie: As used in this disclosure, a cable tie is a type of fastener that is used to tie two objects together. The cable tie has a box end and an open end. The box end further comprises a gear like structure wherein when the open end is inserted into the gear like structure, the gear like structure acts as a ratchet that prevents the open end from being removed from the gear like structure.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chemical: As used in this disclosure, a chemical refers to a substance of a known or fixed composition. The term chemical is used to describe the substance when the details of the composition of the substance or properties of the substance are considered relevant to the disclosure at bar. The term properties is taken to mean both the measurable properties of the substance and the interactions of a first chemical with a second chemical. The term compound refers to: a) a chemical structure that comprises a one or more chemical bonds; or, b) a unified chemical structure formed from a mixture of chemicals. The term compound is informally considered a synonym for the term chemical. The term chemistry refers to the study and the use of the knowledge of the composition and properties of chemicals. The terms chemical reaction refers to the interactions between two or more chemical structures.

Coating: As used in this disclosure, a coating refers to a substance that is applied to the exterior surface of an object such that the coating forms a new exterior surface of the object. A coating is commonly said to be formed as a layer. Paint is an example of a common coating material.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electromagnet: As used in this disclosure, an electromagnet is a core formed from a magnetic material that has a coil formed from an electric current carrying conductor wrapped around it. When an electric current flows through the coil, The core exhibits magnetic properties when an electric current flows through the coil and exhibits no (or reduced) magnetic properties when an electric current is not flowing through the coil.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Light String: As used in this disclosure, a light string is a commercially available lighting device. The light string illuminates a structure or a space. The light string comprises a cable and a plurality of illuminating elements. The plurality of illuminating elements are distributed along the span of the length of the cable. The cable forms the load path that transfers the load of the plurality of illuminating elements to a supporting structure. The flexible nature of the cable of the light string allows the light string to bend around corners during installation. The light string draws power from an external power source such as the national electric grid. The cable distributes the electric power to the illuminating elements of the light string. Examples of a light string include, but are not limited to, holiday (Christmas) lights and LED ropes.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field. A magnet is further defined with a north pole and a south pole. By aligning with an external magnetic field is meant that the north-south pole structure of a first magnet will align with the north south pole of a second magnet. The pole of any first magnet will attract the opposite pole of any second magnet (i.e. a north pole will attract a south pole).

Magnetic Material: As used in this disclosure, a magnetic material is a substance that attracts or is attracted to a magnet but that itself has no net magnetic moment (beyond any residual moment created by prior use). Common classes of magnetic materials include ferromagnetic, diamagnetic, paramagnetic, ferrimagnetic and antiferromagnetic.

Negative Space: As used in this disclosure, negative space is a method of defining an object through the use of open or empty space as the definition of the object itself, or, through the use of open or empty space to describe the boundaries of an object.

Neodymium: As used in this disclosure, neodymium (CAS 7440-00-8) refers to the chemical element with atomic number 60. Neodymium is a metal in the lanthanide row of the periodic table. Neodymium is commonly used to make alloys and magnets. Neodymium is abbreviated as Nd.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner diameter.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Recess: As used in this disclosure, a recess is a disk-shaped negative space that is formed at the congruent end of prism-shaped structure. The recess is positioned relative to the congruent end of prism-shaped structure to form a composite prism negative space structure. The recess is sized to receive an object such that the object is below the plane of the surface in which the recess is formed.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A holiday light attachment system comprising
an elevated anchor, a cable holder, a shaft mount, an extension shaft, and a light string;
wherein the cable holder attaches the light string to the elevated anchor;
wherein the shaft mount attaches to the extension shaft;
wherein the shaft mount is a tool that secures the cable holder to the elevated anchor;
wherein the elevated anchor comprises a first magnet,
wherein the first magnet magnetically attaches the cable holder to an elevated structure;
wherein the cable holder comprises a disk structure, a loop structure, a cable tie, and a second magnet;
wherein the loop structure forms an anchor point used by the cable tie to bind a cable of the light string to the cable holder;
wherein the second magnet magnetically attaches the first magnet such that the second magnet secures the cable holder to the elevated anchor;
wherein the shaft mount further comprises a c-channel, a threaded connection, and a third magnet;
wherein the c-channel forms a track structure that allows the cable of the light string to insert into the physical structure of the c-channel as the c-channel is attaching the cable holder from the elevated anchor;
wherein the elevated anchor removably inserts into the c-channel such that the shaft mount can elevate the elevated anchor to the elevated structure;
wherein the elevated anchor removably inserts into the c-channel such that the c-channel releases the elevated anchor after attaching the elevated anchor to the elevated structure;

wherein the cable holder removably inserts into the c-channel such that the shaft mount can elevate the cable holder to the elevated anchor;
wherein the cable holder removably inserts into the c-channel such that the c-channel releases the cable holder after attaching the cable holder to the elevated anchor;
wherein the third magnet removably inserts into the c-channel such that the shaft mount can elevate the third magnet to the cable holder;
wherein the third magnet captures the cable holder by magnetically attaching to the cable holder such that the third magnet will remove the cable holder from the elevated anchor.

2. The holiday light attachment system according to claim 1
wherein the holiday light attachment system attaches the light string to the elevated structure;
wherein the light string comprises the cable and a plurality of illumination elements;
wherein the plurality of illumination elements electrically connect to the cable such that the cable suspends the plurality of illumination elements from the elevated anchor;
wherein the plurality of illumination elements electrically connect to the cable such that the cable provides electric energy used to illuminate the plurality of illumination elements.

3. The holiday light attachment system according to claim 2
wherein the shaft mount attaches to the extension shaft using a threaded connection;
wherein the shaft mount attaches to the extension shaft to form a composite structure;
wherein the extension shaft is an extension structure.

4. The holiday light attachment system according to claim 3
wherein the elevated anchor is a mechanical structure;
wherein the elevated anchor permanently attaches to the elevated structure;
wherein the elevated anchor suspends the cable holder from the elevated structure;
wherein the elevated anchor mounts in the shaft mount such that the shaft mount and the extension shaft elevate and attach the elevated anchor to the elevated structure.

5. The holiday light attachment system according to claim 4
wherein the cable holder is a mechanical structure;
wherein the cable holder attaches to the elevated anchor;
wherein the cable holder attaches to the light string;
wherein the cable holder attaches the light string to the elevated anchor;
wherein the cable holder mounts in the shaft mount;
wherein the shaft mount and the extension shaft elevate the cable holder to the elevated anchor to attach the cable holder to the elevated anchor;
wherein the shaft mount and the extension shaft elevate the cable holder to the elevated anchor to detach the cable holder from the elevated anchor.

6. The holiday light attachment system according to claim 5
wherein the shaft mount is a mechanical structure;
wherein the shaft mount attaches to the extension shaft;
wherein the elevated anchor attaches to the shaft mount such that the shaft mount and the extension shaft form an extension structure that elevates the elevated anchor to the elevated structure;
wherein the cable holder attaches to the shaft mount such that the shaft mount and the extension shaft form an extension structure that elevates the cable holder to the elevated anchor.

7. The holiday light attachment system according to claim 6
wherein the elevated anchor comprises an adhesive;
wherein the first magnet is a disk-shaped structure;
wherein the first magnet is a permanent magnet;
wherein the first magnet permanently attaches to the elevated structure;
wherein the adhesive is a chemical compound; wherein the adhesive is applied as a coating to a congruent end of the disk shape of the first magnet;
wherein the adhesive permanently attaches the first magnet to the elevated structure.

8. The holiday light attachment system according to claim 7
wherein the disk structure has a disk shape;
wherein the loop structure attaches to a congruent end of the disk shape of the disk structure;
wherein the loop structure forms a loop;
wherein the cable tie inserts through the loop structure such that the cable tie can wrap around the cable to bind the cable to the loop structure.

9. The holiday light attachment system according to claim 8
wherein the disk structure further comprises a disk recess;
wherein the disk recess is a negative space;
wherein the disk recess is formed in the congruent end of the disk shape of the disk structure that is distal from the loop structure;
wherein the disk recess is geometrically similar to the second magnet such that the second magnet inserts into the disk recess;
wherein the second magnet permanently installs in the disk recess; wherein the second magnet is a disk-shaped structure;
wherein the second magnet is a permanent magnet;
wherein the second magnet permanently attaches to the cable holder.

10. The holiday light attachment system according to claim 9
wherein the shaft mount attaches to the extension shaft to form a composite structure;
wherein the shaft mount forms an extension structure that extends the reach between the extension shaft and the c-channel;
wherein the threaded connection is a fastening structure that allows the extension shaft to screw into the shaft mount;
wherein the c-channel is a mechanical structure;
wherein the c-channel is formed in the shape of a c-channel;
wherein the c-channel forms a track structure that allows the cable of the light string to insert into the physical structure of the c-channel as the c-channel is attaching and detaching the cable holder from the elevated anchor.

11. The holiday light attachment system according to claim 10
wherein the third magnet is a disk-shaped structure;

wherein the third magnet removably inserts into the c-channel;

wherein the third magnet magnetically attaches the second magnet such that the third magnet secures the c-channel to the cable holder;

wherein the magnetic attraction of the third magnet to the second magnet is greater than the magnetic attraction of the second magnet to the first magnet such that the third magnet releases the cable holder from the elevated anchor as the shaft structure is pulled away from the elevated anchor.

* * * * *